Nov. 17, 1936.　　　　W. A. MORTON　　　　2,061,367
FOREHEARTH STRUCTURE
Filed Sept. 4, 1931　　　3 Sheets-Sheet 1

INVENTOR
William A. Morton
By William B. Jaspert
Attorney

Nov. 17, 1936.  W. A. MORTON  2,061,367
FOREHEARTH STRUCTURE
Filed Sept. 4, 1931   3 Sheets-Sheet 2

INVENTOR
William A. Morton
by William B. Jaspert
Attorney

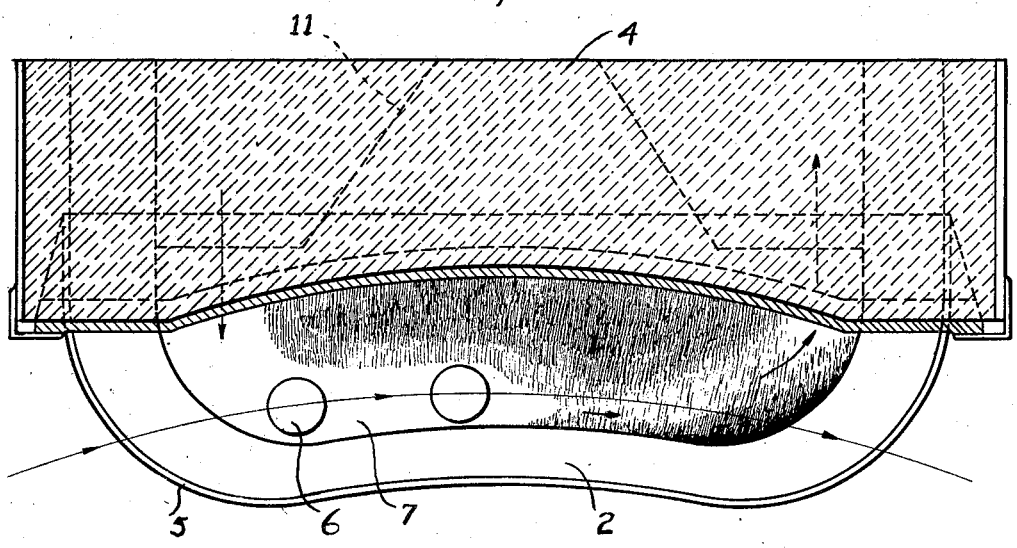

Patented Nov. 17, 1936

2,061,367

UNITED STATES PATENT OFFICE 2,061,367

FOREHEARTH STRUCTURE

William A. Morton, Pittsburgh, Pa., assignor to Amco, Incorporated, Pittsburgh, Pa., a corporation of Pennsylvania Application September 4, 1931, Serial No. 561,126

9 Claims. (Cl. 49—56)

This invention relates to improvements in apparatus for the preparation of glass for bottle forming machinery of the suction type and it is among the objects thereof to provide a forehearth structure for suction forming machines which shall be provided with adjustable means for varying the exposed or working portion of the glass pool.

A further object of the invention is the provision of a forehearth structure embodying means for positively regulating the temperature of the glass in the exposed portion of the pool outside of the furnace structure, including means for producing a luminous surface at the edge of the glass in the bay at which the greatest tendency to solidify occurs.

Still a further object of the invention is the provision of means in a forehearth structure for producing a variable glass flow or movement of the glass, at the working surface of the pool, to provide the proper quality of glass for light or heavy ware and; which shall be adapted to aid in equalizing the temperature of the glass into which the forming machine parison molds dip.

Figure 1:
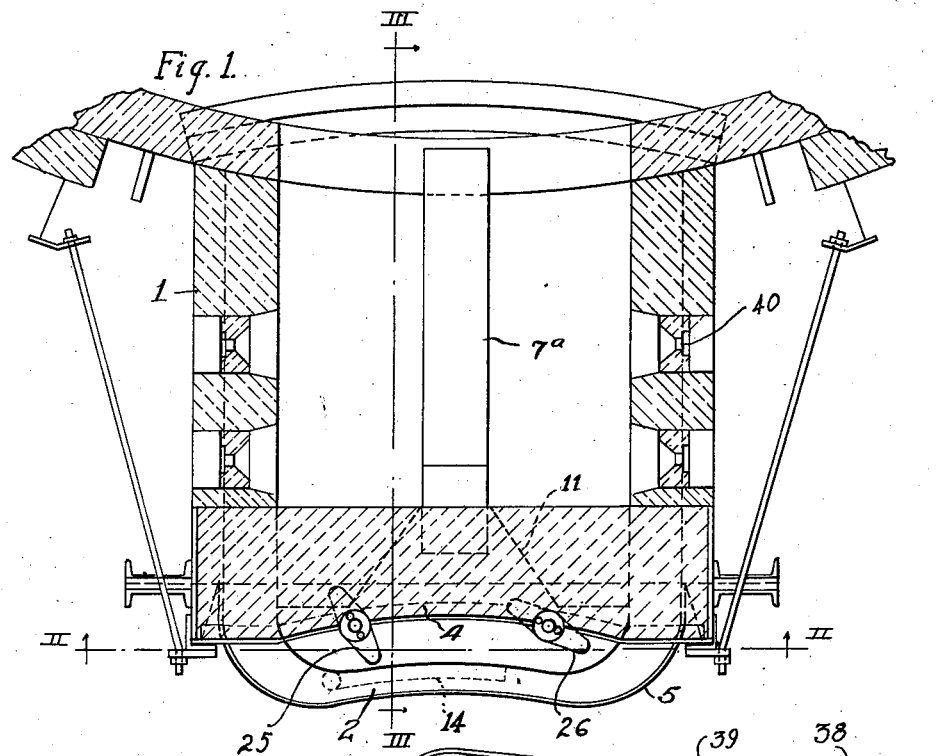
Figure 2:
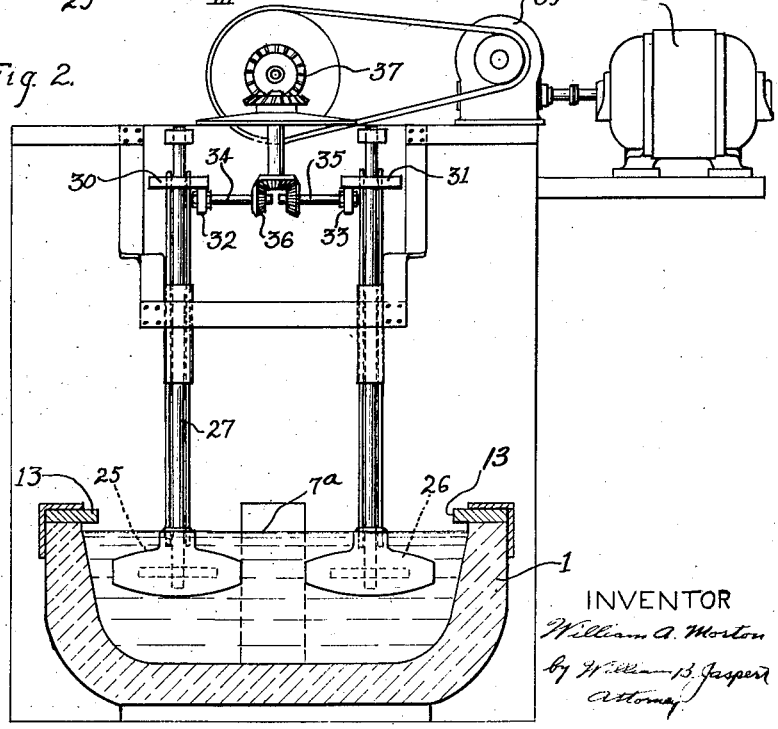
Figure 3:
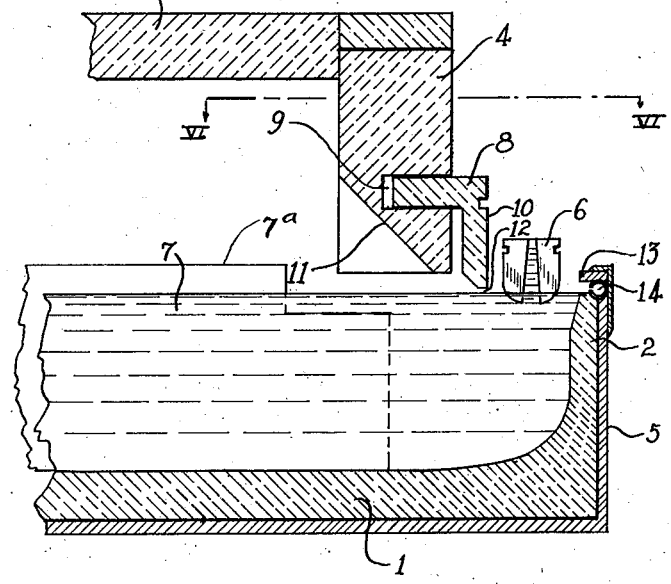
Figures 4, 5:
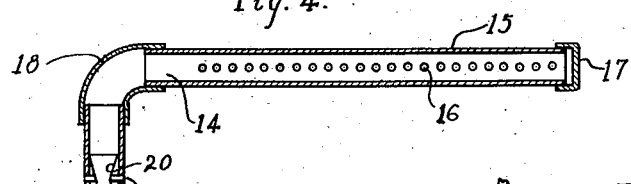
Figure 6:
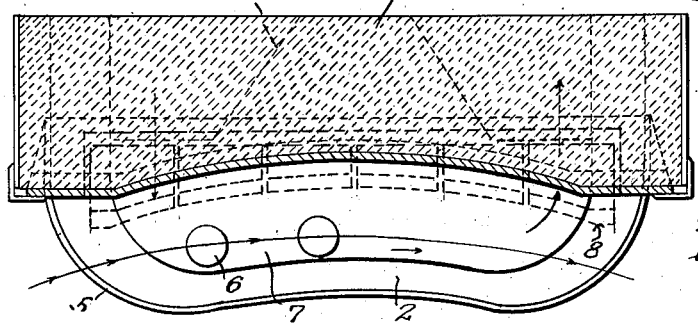

Generally the invention provides one or more means to maintain the glass in proper working condition to be molded. Such means being disclosed in the accompanying drawings in which;

Figure 1 is a horizontal cross-section of a forehearth structure embodying the principles of this invention;

Figure 2 a vertical sectional elevational view thereof with the jack arch and roof removed taken on the line II—II, Figure 1;

Figure 3 a cross-sectional view longitudinally of the forehearth structure illustrating the furnace chamber, the jack arch and the exposed portion of the pool viewed along the line III—III, Figure 1;

Figure 4 a vertical cross-sectional view of the luminous burner at the front end of the forehearth;

Figure 5 a cross-sectional view of one of the paddle members for agitating the glass in the pool, illustrating air cooling means therefor, and Figure 6 a top plan view of the forebay taken along the line VI—VI, Figure 5.

With reference to the several figures of the drawings, the structure therein illustrated comprises a forehearth generally designated by the reference character 1 having a front wall 2, a roof structure 3, and a jack arch 4, and a metallic reinforcing exterior wall housing 5.

The forehearth extends to and in the path of the suction or parison molds 6 of a ware forming machine which molds are successively dipped or otherwise brought in contact with the glass 7 in the pool. To render the exposed portion of the pool variable, an adjustable block of refractory material 8 is disposed in a slot, 9 in the jack arch 4, the block 8 being adjustable to vary the space between the face 10 of the block and the inner edge of the outer wall 2 of the forehearth. The bottom of the jack arch 4 has flared cut away portion 11 to permit access of the hot gases from the interior of the furnace to the exposed portion of the pool, the gases being jetted to the surface of the glass pool in the direction of the outer corners of the forebay. The movable block 8 is preferably movable in a vertical direction as well as in a horizontal direction for the purpose of varying the space 12 through which the hot gases of the furnace are jetted to the exposed glass.

A refractory block 13 is provided at the top of the outer wall 2 of the forehearth in spaced relation with the top of wall 2 and a burner 14 is disposed between the block 13 and the wall 2 with the burner jet directed to the surface of the glass adjacent the refractory block 13.

The burner 14 is constructed in the manner shown in Figure 4 of the drawing and consists of a pipe 15 having perforations 16 constituting gas jets, the pipe 15 being closed as by a cap 17 at one end and being connected through an elbow 18 to a vertical pipe 19 leading to the atmosphere.

As shown in Figure 1 of the drawings, the burner 14 projects or extends along a portion of the front wall only, preferable in the region where the glass flows from the interior of the furnace to the forebay which is at a point in advance of where the glass is drawn up by the suction molds 6.

The vertical pipe 19 of the burner is provided with an injector 20 having openings 21 leading to the atmosphere and having a gas jet 22 cooperating with the constricted throat of the jet 20, the injector 22 being connected to a gas supply line 23.

The gas injector functions to entrain a sufficient volume of air to render the gas supply a combustible mixture which will produce a very hot flame directly beneath the refractory block 13 to render it luminous and increase the radiant effect of the burner at the edge of the glass which is the point where the glass has the greatest tendency to solidify.

By providing the cut-out or chamfered portions 11 at the sides of the jack-arch 4, the heat from the interior of the fore-hearth chamber is concentrated at the sides of the surface glass in the forebay thereby setting up a stream or glass flow as illustrated in Figure 6.

In Figure 6 the molds 6 are shown moving in a path designated by arrows. The flared cut-out portions 11 of the jack arch 4 concentrates the heat to the restricted areas adjacent the side walls with the result that the glass is of higher temperature and lower viscosity at the areas indicated by the light shading in the forebay.

The glass entering the forebay at the left into the path of molds 6 is the hottest and by contact with the moving molds is caused to flow toward the right hand side of the forebay. The dark shaded areas indicate the colder glass which is of lowest temperature adjacent the front wall at the right hand side. Since the heat from the interior of the furnace is also concentrated at the side where the glass passes from the forebay to the inner chamber, the glass moving to this heated area will again increase in temperature and set-up flow thereby producing a stream or current throughout the entire portion of the pool or glass in which the molds travel.

In addition to the means for delivering heat to the glass, means for regulating the temperature of the glass and maintain it in proper working condition is provided through the use of one or more paddle wheels such as the paddles 25 and 26 of Figures 1 and 2 which are submerged below the surface of the glass pool 7 between the jack arch 4 and front wall 2. By employing the adjustable block 8, the exposed surface of the glass may be restricted within the limits required to permit the free travel of the suction molds 6 and by adjusting or removing the block 8, the paddle wheels 25 and 26 can readily be removed for renewal or repairs.

The paddles 25 and 26 are preferably refractory material supported by hollow shafts 27 through which a cooling pipe 28 is extended to branches 29 within the block per se. The cooling medium such as air is conducted through the interior of the shafts 27 to prevent excessive heating of blocks 25 and 26. The shafts 27 are supported in the roof structure of the forehearth and are rotated through a suitable drive mechanism which consists of the following.

The shafts are driven through roller friction discs 30 and 31 by friction rollers 32 and 33 respectively, the drive rollers being mounted on shafts 34 and 35 which are driven through bevel gears 36 and reduction gears 37 by the motor 38 which is connected to a reducer mechanism 39.

The friction rollers 32 and 33 are mounted to be movable by means of shifting yokes, in a well known manner, to effect contact with the driven discs 30 and 31 at different radial positions to vary the speed of rotation of the shafts for the paddle wheels 25 and 26. For example, as shown in Figure 2 of the drawings, the roller 33 is contacting the driven disc 30 near the center causing the disc 31 to be operated at a much greater speed than the disc 30. By shifting the rollers 32 and 33 the relative speeds of the paddles 25 and 26 may be varied in accordance with the particular movement of the glass desired from and to the furnace through the forebay structure. Also by adjusting the speeds of the paddles, the glass at the exposed portion of the pool 7 can be made to flow at substantially the same speed of travel as the suction mold 6 which has the advantage of disposing of all of the chilled glass that results from the shearing of the glass hanging to the parison. By moving the glass in the forebay at substantially the same rate as the mold, the tendency to trap air in the glass which forms blisters is greatly reduced, and where such blisters are formed, they are carried into the furnace where the higher temperature of the glass permits the air to escape as the viscosity of the glass in which the air is entrapped is greatly reduced at the higher temperature.

As shown in Figure 1, a plurality of burner ports 40 are provided in the side walls of the forehearth to maintain proper working temperature of the glass therein and to reheat the chilled glass which is returned to the forehearth chamber by the paddle 26.

In the operation of the device the glass in the forehearth is brought to proper working temperature by regulating the burners in the ports 40 of the side wall structure, and the burner 14 is ignited before the suction forming machine is placed in operation. The movable block 8 of the jack-arch is adjusted to expose a minimum portion of the glass pool in the region of contact of the parison molds. The hot gases jetted from the furnace through the chamfered portion 11 of the jack-arch, and the heat of the burner 14 will bring the glass at the surface of the pool to proper working temperature very rapidly. The paddle wheels 25 and 26 are set in motion by energizing the motor 38, and by regulating the relative speeds of the paddles the glass is moved at preferably the speed of movement of the parison molds 6.

As the parison molds contact with the glass pool and are raised above the surface of the pool provision is made for cutting or shearing-off the tailings which drop back into the pool in a somewhat chilled condition. The paddle member 26 causes the chilled tailings to be returned to the interior chamber of the forehearth to be reconditioned and the paddle 25 continues to feed good glass from the furnace portion of the forehearth to the exposed forebay. A partition wall 7—a may be provided in the forehearth chamber to divide the glass to prevent the cold glass leaving the forebay from passing to the glass flowing from the chamber before it is properly conditioned for use.

By changing the chilled glass for glass of somewhat higher temperatures in the exposed portion of the forebay, a general equalization of temperature of glass is obtained due to the action of the paddles and the motion set up in the glass by the vacuum applying the various mold charges from the viscous mass. The combined effect of the pulling of the glass in the moving parison prior to shearing, the rotary paddles, the premixed gas burner, and the jet effect of the jack arch are all conducive to bring about normal temperature to insure sufficient uniformity in the glass mass and to facilitate the production of commercial ware.

Although one embodiment of the invention has been herein illustrated and described, it will be obvious to those skilled in the art that various modifications may be made in the details of construction without departing from the principles herein set forth, for example; the natural flow, induced by the concentration of heat to restricted areas, may be the sole means employed for providing glass of suitable working temperatures in the forebay, or the paddle members and endwall burners may be employed alone or in conjunction with the induced flow means.

I claim:

1. In an exposed furnace forebay adapted to deliver conditioned molten glass to suction type gathering molds, means for conditioning the glass comprising an extended horizontal burner delivering a sheet of heated gases from the front of the forebay parallel with the surface of the glass exposed in the forebay.

2. In combination, a stationary forehearth structure to contain molten glass and including an exposed forebay portion, a gathering area in said exposed portion, and a transverse arch dividing the forehearth and forebay having edge portions over the glass and having a central member adjustable toward the outer periphery of the forebay to vary the gathering area in said forebay.

3. In a forehearth for molten glass, the combination which comprises an enclosed heating chamber and an exposed forebay portion, a transverse arch dividing the forehearth and forebay having edge portions over the glass and a central member depending toward the glass, a wall in the forehearth dividing the glass into two independent streams adapted to be moved in opposite directions with respect to each other and a pair of rotary paddles in the forebay to move the glass in the forebay and the said streams, said arch having its inner wall recessed on both sides of the dividing wall to direct the hot gases from the heating chamber to the outer corners of the forebay.

4. A forehearth structure comprising a covered portion constituting a heating chamber and an exposed portion constituting a forebay, a molten glass gathering path in the forebay and continuous means interposed between the outer edge of the forebay and along said forebay substantially parallel to the said gathering path for projecting a flame parallel to and adjacent the surface of the glass in the forebay.

5. The method of conditioning molten glass in the gathering area of an exposed furnace forebay for supplying a suction type gathering device which consists in heating the exposed surface of the glass in the gathering area of the forebay by directing a heat flame parallel with the surface of the glass from a point beyond the outer periphery of the glass pool and utilizing said heating means for heating the edge of the refractory support for the exposed portion of the gathering area.

6. In combination, a glass melting furnace including a wall having an outlet opening through which the glass flows, a forebay to which the glass flows from said opening, said forebay providing an upwardly facing exposed surface of molten glass and including a curved outer wall, a burner and cover plate including a manifold adapted to rest upon the wall of the forebay, said manifold having a series of inwardly facing ports, a horizontal cover plate projecting inwardly from the manifold just above the ports, means for supplying fuel to the manifold, and means for removably mounting the burner and cover plate upon the forebay.

7. In an exposed forebay adapted to deliver conditioned molten glass to suction-type gathering molds, means for conditioning the glass comprising, an extended horizontal burner delivering a sheet of heated gases from the front of the forebay parallel with the surface of the glass exposed in the forebay, and a radiant above said burner for reflecting heat to the surface of the glass.

8. In an exposed forebay adapted to deliver conditioned molten glass to suction-type gathering molds, means for conditioning the glass comprising, an extended horizontal burner delivering a sheet of heated gases from the front of the forebay parallel with the surface of the glass exposed in the forebay, and a refractory member above the burner to increase the radiant effect of the burner at the edge of the glass pool.

9. In combination, a stationary forehearth for supporting a pool of molten glass and including an exposed forebay portion, a gathering area in said exposed portion, a transverse arch dividing the forehearth and forebay and a burner delivering a sheet of heated gases from the front of the forebay parallel with the surface of the glass exposed therein, said transverse arch being reduced in its cross-sectional area at its lowermost depending portion to direct hot gases from the forehearth structure which, together with the heat of the burner, will maintain the surface of the glass pool at proper working temperatures.

WILLIAM A. MORTON.